UNITED STATES PATENT OFFICE.

PETER MURRAY, OF SEATTLE, WASHINGTON.

METHOD OF PRESERVING TIMBER.

SPECIFICATION forming part of Letters Patent No. 495,991, dated April 25, 1893.

Application filed September 14, 1892. Serial No. 445,901. (No specimens.)

*To all whom it may concern:*

Be it known that I, PETER MURRAY, a citizen of the United States, residing at Seattle, in the county of King and State of Washington, have invented certain new and useful Improvements in Methods of Preserving Timber; and I do declare the following to be a full, clear, and exact description of the invention, such as will enable others skilled in the art to which it appertains to make and use the same.

My invention consists of a method of treating timber, piles, &c., which are located below the water to protect them from the ravages of the teredo, and other boring worms which infest salt water; my object is to devise a more effective, inexpensive, and easily practiced method than has heretofore been known.

To this end my invention consists of first preparing a composition consisting of the following ingredients: coal oil, kerosene oil, or other hydrocarbons, one gallon; grease, lard, or other animal fat, two gallons; ground brimstone or other sulphurous compound, one pound. These ingredients are to be mixed and the timber to be treated thoroughly coated therewith. When this has been accomplished the whole is ignited. It will burn steadily until the timber is charred to the depth of one-quarter to one-half an inch. At this stage the process is complete and the timber ready for use.

Timber treated by this method will successfully resist the ravages of all boring worms which are so detrimental to the lives of piles, &c., sunken in salt water.

Having thus described my invention, what I claim as new, and desire to secure by Letters Patent, is—

The herein described method of treating timber, which consists of first coating the same with a composition of coal oil, mineral oil, or other hydrocarbon, animal fat, and brimstone or other sulphurous substances, and burning the composition while applied to the timber until the composition is consumed, as set forth.

In testimony whereof I affix my signature in presence of two witnesses.

PETER MURRAY.

Witnesses:
 GEO. H. KING,
 THEO. J. DE PUY.